US010683214B2

(12) United States Patent
Chung et al.

(10) Patent No.: US 10,683,214 B2
(45) Date of Patent: Jun. 16, 2020

(54) MULTI-EFFECT DESALINATION APPARATUS PARTIALLY DOSING ACIDS INTO SOME EVAPORATOR AND DESALINATION METHOD USING THE SAME (71) Applicant: DOOSAN HEAVY INDUSTRIES & CONSTRUCTION CO., LTD., Gyeongsangnam-do (KR)

(72) Inventors: Hyun Chul Chung, Gyeongsangnam-do (KR); Amr Mohamed Mahmoud Sayed Ahmed, Al-Khobar (SA); Seung Won Ihm, Seoul (KR); Muhammad Adnan Saroosh, Al-Khobar (SA)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 216 days.

(21) Appl. No.: 15/137,309

(22) Filed: Apr. 25, 2016

(65) Prior Publication Data
US 2016/0326014 A1 Nov. 10, 2016

(30) Foreign Application Priority Data

May 7, 2015 (KR) .......................... 10-2015-0063983

(51) Int. Cl.
*C02F 1/04* (2006.01)
*B01D 1/26* (2006.01)
(Continued)

(52) U.S. Cl.
CPC ................ *C02F 1/042* (2013.01); *B01D 1/26* (2013.01); *B01D 3/065* (2013.01);
(Continued)

(58) Field of Classification Search
CPC ...... B01D 1/26; B01D 3/065; B01D 19/0068; C02F 1/042; C02F 1/20; C02F 1/66;
(Continued)

(56) References Cited

U.S. PATENT DOCUMENTS 3,218,241 A * 11/1965 Checkovich ........... B01D 3/065
159/17.2
3,389,059 A * 6/1968 Goeldner ................. B01D 3/00
159/13.3
(Continued)

FOREIGN PATENT DOCUMENTS

JP 49-17373 2/1974
JP 55-059879 A 5/1980
(Continued)

OTHER PUBLICATIONS

KR1020097023708A_ENG (KIPRIS translation of Hamad) (Year: 2010).*
(Continued)

*Primary Examiner* — Youngsul Jeong
*Assistant Examiner* — Gabriel E Gitman
(74) *Attorney, Agent, or Firm* — Invenstone Patent, LLC (57) ABSTRACT The present disclosure relates to a multi-effect desalination apparatus by partially dosing acids into only evaporators corresponding to a relatively high temperature part, while dosing a polymer-based anti-scalant into all the evaporators, to minimize a risk of a scale and corrosion with maximizing a top brine temperature of desalination facility, and a desalination method using the same.

10 Claims, 6 Drawing Sheets

US 10,683,214 B2

Page 2

(51) Int. Cl.
*C02F 1/20* (2006.01)
*B01D 3/06* (2006.01)
*C02F 9/00* (2006.01)
*B01D 19/00* (2006.01)
C02F 5/10 (2006.01)
C02F 103/08 (2006.01)
C02F 1/66 (2006.01)
C02F 1/00 (2006.01)
C02F 1/68 (2006.01)

(52) U.S. Cl.
CPC ............ *B01D 19/0068* (2013.01); *C02F 1/20* (2013.01); *C02F 9/00* (2013.01); C02F 1/008 (2013.01); C02F 1/66 (2013.01); C02F 1/686 (2013.01); C02F 1/687 (2013.01); C02F 5/10 (2013.01); C02F 2103/08 (2013.01); C02F 2209/001 (2013.01); C02F 2209/02 (2013.01); C02F 2209/06 (2013.01); C02F 2209/40 (2013.01); Y02A 20/128 (2018.01)

(58) Field of Classification Search
CPC .. C02F 1/686; C02F 1/687; C02F 5/10; C02F 2103/08; C02F 2209/001; C02F 2209/008; C02F 2209/02; C02F 2209/06; C02F 2209/40
See application file for complete search history.

(56) References Cited

U.S. PATENT DOCUMENTS

| 3,814,671 | A |   | 6/1974 | Roller |             |
|-----------|---|---|--------|--------|-------------|
| 3,871,968 | A | * | 3/1975 | Wood   | C02F 1/04   |
|           |   |   |        |        | 202/173     |
| 3,901,768 | A | * | 8/1975 | Steinbruchel | B01D 1/16 |
|           |   |   |        |        | 202/174     |
| 4,444,675 | A | * | 4/1984 | Goeldner | C02F 1/042 |
|           |   |   |        |        | 203/7       |
| 5,968,312 | A | * | 10/1999 | Sephton | B01D 1/065 |
|           |   |   |        |        | 159/18      |
| 6,646,082 | B2 | * | 11/2003 | Ghosh | C08F 22/40 |
|           |   |   |         |       | 526/258 |
| 2008/0099154 | A1 | * | 5/2008 | Minnich | C02F 1/048 |
|           |   |   |         |         | 159/47.3 |

FOREIGN PATENT DOCUMENTS

| JP | 03-127699 A | 5/1991 |   |   |
|----|-------------|--------|---|---|
| JP | 08-071535 A | 3/1996 |   |   |
| JP | 2008-149226 A | 7/2008 |   |   |
| JP | 2010-515569 A | 5/2010 |   |   |
| JP | 2014-511402 A | 5/2014 |   |   |
| KR | 10-2009-0107534 A | 10/2009 |   |   |
| KR | 10-2010-0015981 A | 2/2010 |   |   |
| KR | 1020097023708 A | * | 2/2010 | ............... B01D 1/04 |
| KR | 10-0982052 B1 | 9/2010 |   |   |
| KR | 10-2010-0016519 A | 11/2012 |   |   |
| WO | 2004/035479 A1 | 4/2004 |   |   |
| WO | 2008088975 A1 | 7/2008 |   |   |
| WO | 2012104325 A1 | 8/2012 |   |   |

OTHER PUBLICATIONS

Japanese Office Action dated Feb. 17, 2017 in connection with Japanese Patent Application No. 2016-093046 which corresponds to the above-referenced U.S. application.
H. M. Muller-Steinhagen et al., "Comparison of Indices for the Scaling and Corrosion Tendency of Water." The Canadian Journal of Chemical Engineering. vol. 66, Dec. 1998, pp. 1005-1007.
Korean Office Action dated Jun. 7, 2016 corresponding to Korean Patent Application No. 10-2015-0063983.
Extended Search Report issued in corresponding European Application No. 16168311.5, dated Sep. 2, 2016, 13 pages.

* cited by examiner

MULTI-EFFECT DESALINATION APPARATUS PARTIALLY DOSING ACIDS INTO SOME EVAPORATOR AND DESALINATION METHOD USING THE SAME

CROSS-REFERENCE TO RELATED APPLICATIONS

This application claims priority to Korean Application No. 10-2015-0063983, filed May 7, 2015, the contents of which are incorporated herein in their entirety.

BACKGROUND

The present disclosure relates to a multi-effect desalination apparatus partially dosing acids into evaporators of a high temperature and to a desalination method using the same, and more preferably relates to a technique for increasing the top brine temperature (TBT) of a multi-effect desalination apparatus by additionally dosing acids partially, that is, only into the evaporators corresponding to a high temperature part (H), to minimize a risk of scale and corrosion together with an anti-scalant.

Generally, a desalination facility is one producing fresh water which can be used as water for living or industrial use from seawater or wastewater, and Multiple Stage Flash (MSF) and Multi-effect Distillation (MED) methods are mostly used, as well as Reverse Osmosis (RO) which uses pressure as a membrane filtration. A hybrid type combining two or more of these methods is also used to increase an output of fresh water and effectiveness.

Among these, a desalination facility by the multi-effect distillation is equipped with an evaporator comprising several effects and with multiple heat exchange tubes wherein high-temperature steam is passed through an interior heat exchange space of each effect and feed water is sprayed onto the exterior.

In addition, each evaporator is constructed so that the steam is fed by connecting each effect by a steam feed tube from the first effect, the produced water generated from each evaporator is connected to a recovery line of fresh water to be discharged by a fresh water pump, and a concentrated water with high concentration is discharged to the exterior through a discharge.

First, high-temperature steam is fed to the evaporator (100A) of the first effect and feed water is sprayed through the spray nozzle while making the heat exchange on the surface of the heat exchange tube. Therefore, the steam in the interior of the heat exchange tube is condensed to make fresh water, simultaneously with generating the steam in the heat exchange space in the interior of the evaporator, and the generated steam acts as a heat source to the evaporator (100B) of the next effect through the steam feed tube. The continuous heat exchange can be completed in evaporator (100N) of the most downstream evaporator.

Various efforts have been made to prevent the scale formed by hardness materials included in the feed water in the common desalination facility such as MED, MSF, and the like. There was a method for inhibiting a formation of scale by acid treatment, but since it should accompany an installation of an additional decarbonizing/degassing facility together with the risk for corrosion, the method was avoided due to problems such as additional electrical power consumption, and its use disappeared with the development of a polymer-based anti-scalant.

However, the scale risk for an evaporator corresponding to a 'high temperature part' of a number of evaporators, especially the upstream part was not sufficiently resolved only by the newly developed anti-scalant, and thus, since the desalination facility cannot be driven with the top brine temperature (TBT) set higher than a certain level, there were problems of reduced economical efficiency or effectiveness.

Therefore, Laid-open Korean Patent Publication No. 2010-0016519 ('Desalination apparatus and method', published on Feb. 12, 2012) disclosed a method for increasing the top brine temperature of the desalination facility by separately installing a Nano Filter (NF), RO membrane, etc. on the front of the desalination facility to remove beforehand the material generating the scale, but the method is inefficient since it needs a large-scale facility for the additional pre-treatment and thus increases the CAPEX and OPEX of all processes.

BRIEF SUMMARY

The present disclosure is provided to solve the above problems, and provides a desalination apparatus and method for maximizing the top brine temperature of the desalination facility while minimizing the risk for corrosion and scale by dosing acid into only the evaporators corresponding to a high temperature part, while dosing polymer-based anti-scalant into all evaporators.

According to one preferable embodiment of the present disclosure, the present disclosure provides the multi-effect desalination apparatus characterized in equipping with:

multiple effects (100) connected in series in which multiple heat exchange tubes are arranged in an interior heat exchange space, high-temperature steam is passed inside the heat exchange tubes, and feed water is fed to the external surface to generate the steam and concentrated water from the feed water through a heat exchange between the steam and feed water; and a feed water pipe (200) feeding the feed water to each of the multiple effects (100) in parallel, wherein the high-temperature steam is fed to an effect (100A) arranged at the farthest upstream end among the multiple effects (100), the steam generated from the feed water through the heat exchange is fed to an adjacent effect (100B) to continue the heat exchange through the farthest downstream effect (100N), and the feed water pipe (200) is equipped with at least one of additive-dosing part (210) for dosing the additive to inhibit the generation of scale in the feed water entering from the exterior, and at least one of pre-heaters (220) for heating the feed water to be entered.

The above additive dosing part (210) can comprise at least one of the first dosing part (211) dosing a polymer-based anti-scalant; and at least one of the second dosing part (212) dosing acid.

It is preferable that the polymer-based anti-scalant is an acrylic polymer comprising ethylenically unsaturated co-monomer as a polymer unit. The acid is selected from an inorganic acid including sulfuric acid, nitric acid or phosphoric acid; organic acid including carboxylic group or suphonic acid group; or the mixtures thereof.

At this time, it is preferable that the first dosing part (211) is equipped to the higher stream than the second dosing part (212) on the feed water pipe (200).

In addition, the anti-scalant dosed from the dosing part (211) is dosed into feed water fed to all multiple evaporators (100), and the acid dosed from the second dosing part (212) is dosed into feed water dosed only into the evaporators (100) corresponding to high temperature part (H), the high temperature part (H) may be some evaporators (100) comprising the evaporator (100A) arranged on the farthest upstream end.

At this time, the high temperature part (H) may be at least one of evaporators (100) which the concern or risk of scale formation is risen to the constant level or more to be designated based on a tendency according to the temperature of hardness index representing the concern level of scale or corrosion formation for the feed water calculated by a pH value ($pH_s$) when the feed water is saturated by calcium carbonate and a pH value ($pH_f$) of the feed water to be measured.

The hardness index may be a Ryzar Stability Index (RSI) value calculated by the below mathematic formula 2 or a Langelier Saturation Index (LSI) value calculated by the below mathematic formula 3, based on the $pH_s$ value and the $pH_f$ value calculated by the mathematic formula 1.

$$pH_s = -\log(K_2^{SW}) + \log(K_{sp}) - \log(TA) - \log([Ca^{2+}]) \quad \text{[mathematic formula 1]}$$

(Wherein, $K_2^{SW}$ is the second dissociation constant of carbonic acid, $K_{sp}$ is a solubility product constant of calcite in feed water, $[Ca^{+2}]$ is the concentration of calcium ions in feed water, and TA is a total alkalinity.)

$$RSI = 2\, pH_s - pH_f \quad \text{[mathematic formula 2]}$$

$$LSI = pH_f - pH_s \quad \text{[mathematic formula 3]}$$

In addition, the high temperature part (H) may be a number of upstream evaporators (100) including the farthest upstream evaporator (100A) in which the brine temperature is 86 to 110° C., or may be a number of upstream evaporators (100) including the farthest upstream evaporator (100A) in which the brine temperature is 65 to 90° C.

The second dosing part (212) can regulate an amount of the acid dosed into the multiple evaporators (100) corresponding to the high temperature part (H) by equipping the feed water pipe (200) with multiple second dosing parts.

In addition, the first dosing part (211) and the second dosing part (212) are equipped on the separate feed water pipe (200A, 200B) which are divided separately, and the pre-heater (220) is equipped only on the feed water pipe (200) equipped with the first dosing part (211).

The present disclosure also provides a multi-effect desalination method which comprises:

the first additive-dosing step for dosing a polymer-based anti-scalant into the feed water;

the second additive-dosing step for dosing acid to feed water dosed by the anti-scalant; and a feed water-feeding step for feeding each of the multiple evaporators (100) in parallel, in the desalination method using a multi-effect desalination apparatus (Multi-effect Distillator, MED) (A) equipped with the multiple effects (100) connected in series in which multiple heat exchange tubes are arranged to an interior heat exchange space, high-temperature steam is passed inside the heat exchange tubes and the feed water is fed to the external surface to generate the steam and the concentrated water from the feed water through the heat exchange between the steam and feed water, and thus, the steam with high temperature from the exterior is fed to an effect (100A) arranged at the farthest upstream end of the multiple effects (100), and the steam generated from the feed water through the heat exchange is fed to an adjacent effect (100B) to continue the heat exchange through the farthest downstream effect (100N).

The anti-scalant dosed in the first additive-dosing step is dosed into the feed water fed into all of the multiple evaporators (100), the acid dosed in the second additive dosing step is dosed only to the feed water feeding into the evaporators (100) corresponding to the high temperature part (H), and the high temperature part (H) may be some upstream evaporators (100) comprising the evaporator (100A) to be arranged at the farthest upstream end.

In addition, the high temperature part (H) may be at least one of the evaporators (100) for which the risk of scale formation is risen to the constant level or more designated based on a tendency according to the temperature of hardness index representing the concern level of scale or corrosion formation for the feed water calculated by pH value ($pH_s$) when the feed water is saturated by calcium carbonate and pH value ($pH_f$) of the determined feed water.

At this time, it is preferable that the hardness index may be Ryzar Stability Index (RSI) value calculated by the below mathematic formula 2 or Langelier Saturation Index (LSI) value calculated by the below mathematic formula 3 based on the $pH_s$ value and the $pH_f$ value calculated by the mathematic formula 1.

$$pHs = -\log(K_2^{SW}) + \log(K_{sp}) - \log(TA) - \log([Ca^{2+}]) \quad \text{[mathematic formula 1]}$$

(wherein, $K_2^{SW}$ is the second dissociation constant of carbonic acid, the $K_{sp}$ is solubility product constant of calcite in the feed water, the $[Ca^{+2}]$ is the concentration of calcium ions in the feed water, and the TA is a total alkalinity.)

$$RSI = 2\, pH_s - pH_f \quad \text{[mathematic formula 2]}$$

$$LSI = pH_f - pH_s \quad \text{[mathematic formula 3]}$$

The high temperature part (H) may be some evaporators (100) of high stream including the farthest upstream evaporator (100A) which the brine temperature is 86 to 110° C., or may be some evaporators (100) of high stream including the farthest upstream evaporator (100A) in which the brine temperature is 65 to 90° C.

The second additive-dosing step may further comprise a decarbonating/deaerating step removing carbon dioxide and/or air from the feed water which the anti-scale and acid are dosed.

In addition, the amount of acid dosed into multiple evaporators (100) corresponding to the high temperature part (H) may be regulated by dosing acids into the feed water multiple times, in the second additive-dosing step.

A recycling step for recycling all or part of the brine collected from all or some of the multiple evaporators (100) into the feed water and for re-feeding it into the evaporators (100) can be further included.

The condensed water formed by condensing the high-temperature steam fed from the exterior into the evaporator (100A) arranged on the farthest upstream end, through the heat exchange with the feed water, can be recovered independently of the condensed water of the other evaporators (100).

The multi-effect desalination apparatus and desalination method using the same of the present invention, as described above, have effects in that the risk for scale and corrosion in the desalination apparatus can be effectively minimized by a relatively simple method, the consumed amounts of steam and the evaporator material cost are saved by raising the TBT, and the thermal energy efficiency of the facility can be maximized.

BRIEF DESCRIPTION OF THE DRAWINGS

The above and/or other aspects of the disclosure will become apparent and more readily appreciated from the following description of the embodiments, taken in conjunction with the accompanying drawings of which.

DETAILED DESCRIPTION

Reference will be now made in detail to embodiments of the present disclosure with reference to the attached drawings. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the disclosure.

Through the present specification, when any member is posited "on" other members, it also comprises the case that any member is faced on other members as well as the case that another member is present between two members.

Through the present specification, when any part "includes" any constitutive element, it doesn't mean excluding other constitutive elements but it means additionally including other constitutive elements, unless there is any description to the contrary.

The terms "the first", "the second" and the like are to distinguish one constitutive element from other constitutive element, and are not construed to limit the scope of the present invention. For example, the first constitutive element can be called as the second constitutive element, and similarly the second constitutive element can be called as the first constitutive element.

The terms "maximize," "minimize" and the like are to be understood as improving, reduce, and so forth and do not require an extreme optimum unless otherwise noted.

Identification code in each of steps is used for convenience of explanation and does not explain the order of each of steps, and each of steps can be practiced differently from the specified order unless the specific order is described in the context. That is, each of steps can be practiced in the order equivalent to the specified order and can be substantially practiced simultaneously with the order and can be practiced on the contrary order.

DESCRIPTION OF REFERENCE NUMERALS USED IN THE DRAWINGS

Figure 1:
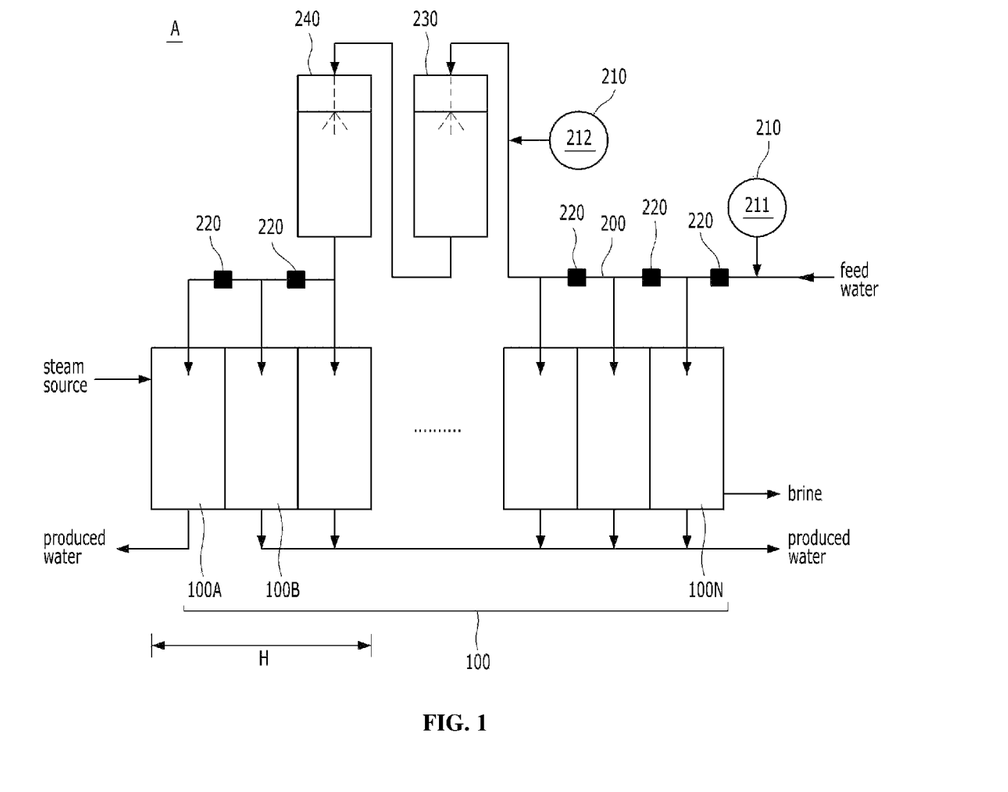
FIG. 1 is a schematic diagram of the multi-effect desalination apparatus (A) according to one Example of the present disclosure.

A: multi-effect desalination apparatus
H: high temperature part
100 (100A, 100B, 100C, . . . , 100N): effect
200 (200A, 200B): feed water pipe
210: additive-dosing part
211: first dosing part
212: second dosing part
220: pre-heater
230: decarbonator
240: deaerator The present disclosure firstly provides a multi-effect desalination apparatus comprising multiple evaporators (effects) connected in series and, feed water pipes feeding the feed water in parallel. A multi-effect desalination apparatus (A) according to one preferable example of the present disclosure is shown in FIG. 1.

In multiple evaporators (100), multiple heat exchange tubes are arranged in the interior heat exchange space, high-temperature steam is passed from exterior (steam source) to interior, and the feed water is fed to the external surface to generate the steam and the concentrate water (brine) from the feeding water through the heat exchange between steam and feeding water.

The multi-effect desalination apparatus comprising such multiple evaporators (100) may be a Multiple Stage Flash (MSF) or Multi-Effect Distillation (MED) type, and in the case of multiple evaporators, it is preferable that the apparatus further comprises a deaerator.

Specifically, the feed water is fed into the evaporator (100A) arranged at the farthest upstream end among multiple evaporators (100) to be directly fed by the exterior steam, the steam generated from it is fed into the interior heat exchange tube of the adjacent evaporator (100B) to undergo heat exchange again, and finally the continuous heat exchange is completed in the evaporator (100N) arranged at the farthest downstream end of the multiple evaporators (100).

At this time, the feed water pipe (200) is provided with at least one additive-dosing part (210) for dosing the additives (chemical) inhibiting scale generation into the feed water entering from the exterior, and at least one pre-heater (220) for heating the entered feed water.

The additive dosing part (210) can be constructed with at least one first dosing part (211) dosing a polymer-based anti-scalant and at least one second dosing part (212) dosing acid.

The above polymer-based anti-scalant can use the known high molecular weight polymer, and can more preferably use acrylic polymer. The acrylic polymer used at this time can comprise 30 wt % or less, preferably 20 wt % or less, and more preferably 10 wt % or less of ethylenically unsaturated co-monomer, based on all ethylenically unsaturated monomer, and the preferable example of the ethylenically unsaturated co-monomer can be methacrylic acid, maleic acid, maleic anhydride, vinylsulphonic acid, allylsulphonic acid, or 2-acrylamido-2-methylpropane sulphonic acid or salts thereof, or the mixtures of such co-monomers (for reference, Laid-open Patent No. KR2014-0003525A of BASF Co. is added as an example of the polymer-based anti-scalant).

At this time, acid can be dosed together with the anti-scalant only into the evaporators (100) corresponding to a high temperature part (H) including the farthest upstream evaporator (100A), while the first dosing part (211) is arranged in the feed water pipe (220) upstream of the second dosing part (212) to dose the anti-scalant into the feed water feeding into all evaporators (100A to 100N).

By limitedly dosing acid into only the high temperature part (H), since the risk of scale can be minimized even for the evaporators (100) effectively set on the high temperature without risk for corrosion, driving is possible by increasing TBT of all facilities to save the consumed amount of steam and material cost of the evaporator, and since it is more economical due to a limited use of the high grade quality of materials for the evaporator and tubes, that is, limited to only the high temperature part (H), the heat efficiency can be maximized without any separate or additional facility.

The acid used at this time can be selected from various inorganic or organic acids and is not specifically limited. Sulfuric acid, nitric acid, phosphoric acid, etc. can be properly used as the inorganic acid, and organic acid comprising carboxyl group such as acetic acid, oxalic acid, tartaric acid, benzoic acid, etc. or organic acid comprising a sulphonic acid group can be properly selected and used as the organic acid. Mixtures thereof can be also used.

In order to increase the top brine temperature by effectively dosing acid to minimize the risk for scale and corrosion of all facilities, the main problem is how evaporator (100) having the high temperature part (H) is set by dividing the evaporator stages according the temperature intervals.

The high temperature part (H) can be set by using a hardness index representing the concern level of feed water scale or corrosion, which is a level at which an appreciable risk of the formation of scale or corrosion exists and is calculated by values of pHs and pHf, where pHs is the pH value when the feed water is saturated by calcium carbonate and pHf is the pH value of feed water determined in real time.

Specifically, as temperature increases, the hardness index reflects a tendency for the concern level of corrosion to be lower and the concern level for scale formation to be higher, and thus, it is preferable to designate the high temperature part (H) to include the upstream evaporators (100) where the risk of scale formation is increased beyond a certain level, by increasing the brine temperature in evaporators upstream of the farthest downstream evaporator (100N).

Therefore, since the scale formation risk can be further minimized by additionally dosing acid into the feed water feeding to the evaporators (100) corresponding to the high temperature part (H), while reducing the risk for scale formation to a certain level together with the risk for corrosion by dosing anti-scalant for the evaporators (100) corresponding to the lower temperature stages downstream, the farthest upstream evaporator (100A) can be driven with a higher brine temperature.

The chosen hardness index can be various forms of indices calculated based on pH values and $pH_f$ values, and preferably a Ryzar Stability Index (RSI) value calculated by the below mathematical formula 2 or a Langelier Saturation Index (LSI) value calculated by the below mathematic formula 3, based on pHs values calculated by the below mathematic formula 1. Besides these, other Carbonate Saturation Indices such as a Puckorius Scaling Index (PSI) can be used.

$$pHs = -\log(K_2^{SW}) + \log(K_{sp}) - \log(TA) - \log([Ca^{2+}])$$ [mathematic formula 1]

(wherein, $K_2^{SW}$ is the second dissociation constant of carbonic acid, $K_{sp}$ is the solubility product constant of calcite in the feed water, $[Ca^{2+}]$ is the concentration of calcium ions in feed water, and TA is a total alkalinity.)

$$RSI = 2\,pH_s - pH_f$$ [mathematic formula 2]

$$LSI = pH_f - pH_s$$ [mathematic formula 3]

Representatively, in explaining about the RSI value, when the calculated RSI value becomes 6 to 7, the feed water may have a relatively stable form. When the RSI value is increased, the corrosion risk level is gradually increased and when the RSI value is lowered, the risk level for scale formation is gradually increased.

When temperature is increased, the RSI value is linearly reduced by a temperature-dependent pHs value. When the pH value ($pH_f$) of the current feed water is increased, a plot of the RSI value according to temperature is parallelly displaced in the negative (−) direction of the y axis (RSI value), and when it is lowered, the plot is parallely displaced in the positive (+) direction of the y axis.

Accordingly, based on the seawater with the inside and outside pH 8 customarily, the concern level for the scale formation can be offset by only the anti-scalant dosed for the downstream evaporators (100) corresponding to the lower temperature stages, the scale risk of the high temperature part (H) evaporators (100) can be minimized by additionally dosing acid for the evaporators (100) corresponding to the high temperature part with the constant temperature more to parallelly displace the graph for RSI value according to the temperature to (+) direction of y axis to control the RSI value to correspond to the stable region being 6 to 7, and thus, since the high temperature part (H) can be set to the high temperature, the driving to the increased top brine temperature is possible.

Meanwhile, the decarbonator (230) and deaerator (240) for removing carbon dioxide and air generated due to dosing of acid can be equipped on the feed water pipe (200) of the downstream of the second dosing part (212). Such decarbonator (230) and deaerator (240) can be constructed with the separate divided unit, and can be constructed with the unit integrated to perform both roles in one unit. Since it is sufficient to dose acid only for a flow rate fed to the high temperature part (H) in relation to the common facility which has to control the scale only by dosing acid, it is economical due to that the size of facility such as a booster pump including decarbonator (230) or deaerator (240) is reduced.

Thus, carbon dioxide (CO2), etc. additionally generated by increasing of TBT and dosing of acid can be used in a post-processing facility such as a Remineralization plant, and the like.

The risk for scale and corrosion can be ascertained in real time in coping with situations varying according to the conditions of the original water, by controlling the amount of anti-scalant or acid to be dosed to the feed water so that the feed water pipe (200), when it is singularly composed, may be equipped with plural first dosing parts (211) or plural second dosing parts (212) or may be constructed using pipes which can receive dosing at multiple locations simultaneously, wherein a position for monitoring the condition of the original water can be properly selected in front of and/or behind a pre-heater (220) in the feed water pipe (200).

Figure 2:
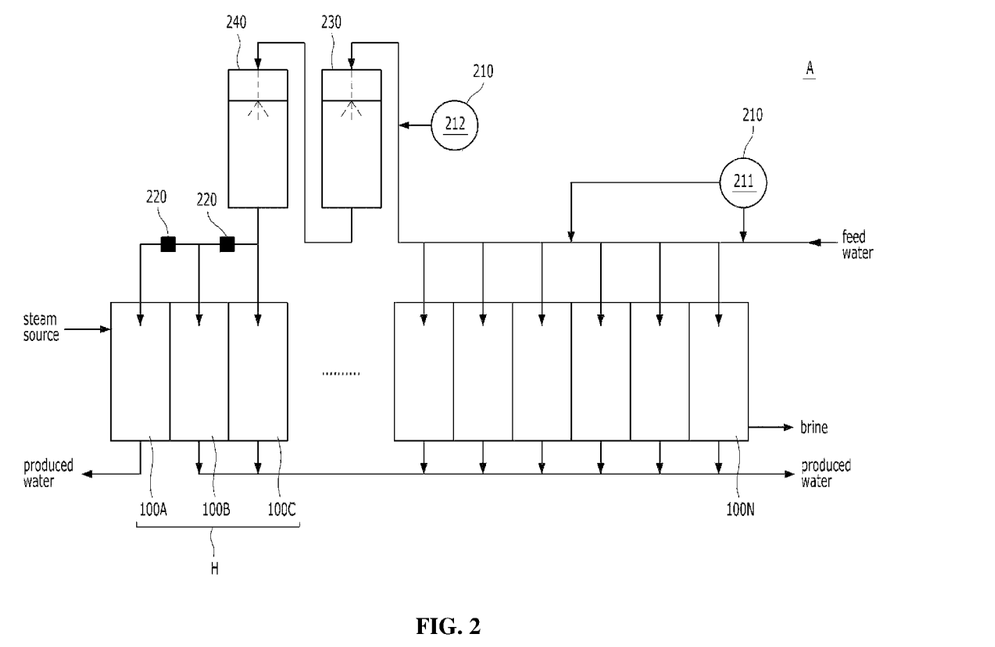
FIG. 2 is a schematic diagram of the multi-effect desalination apparatus (A) according to another Example of the present disclosure.

In addition, it can be controlled for anti-scalant to be dosed once again into an evaporator (100) corresponding to a middle temperature part by additionally sorting the evaporators (100) and classifying the sorted evaporators (100) according to a temperature interval, with classifications including for example a middle temperature part, a low temperature part, etc., as well as the high temperature part (H), as shown in FIG. 2. The facility can be effectively operated by sorting the evaporators (100) into plural groups to properly control the dosing amount of anti-scalant and acid to the scale risk according to the temperature, salinity, etc.

Figure 3:
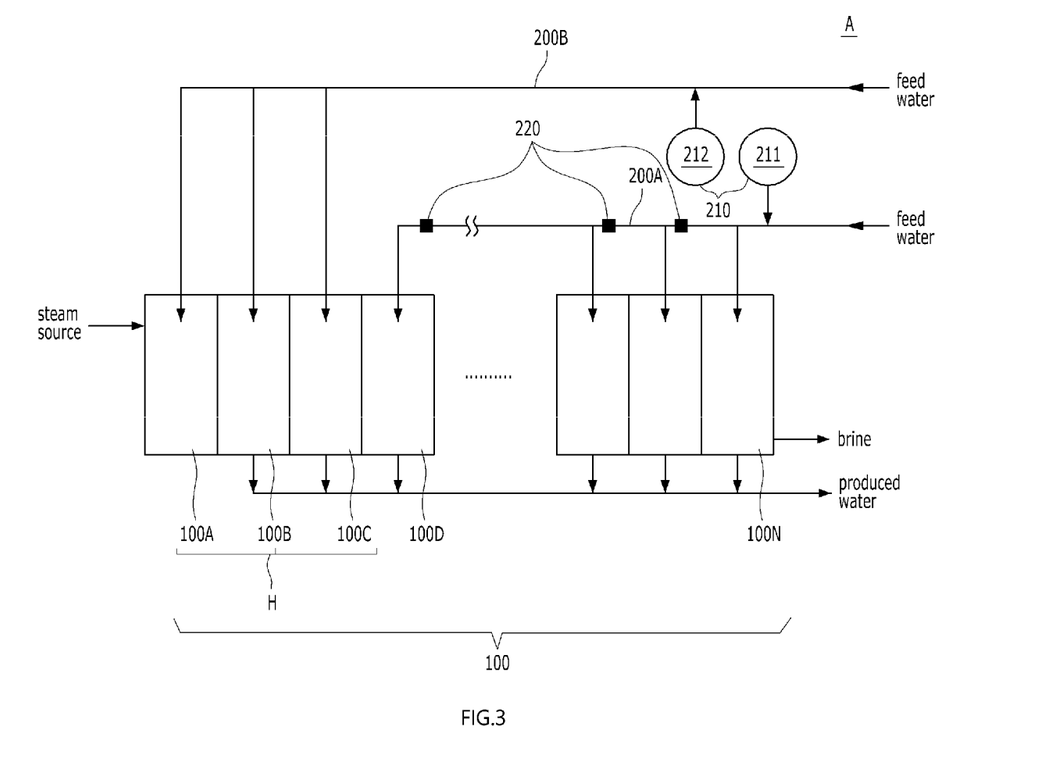
FIG. 3 is a schematic diagram of the multi-effect desalination apparatus (A) according to another Example of the present disclosure.

In addition, the flow rate, temperature, etc. of the feed water to be dosed into the temperature part (H) and feed water to be dosed into the evaporators (100) excluding the high temperature part (H) can be effectively controlled by gradually equipping the first dosing part (211) and the second dosing part (212) on the single feed water pipe (200), as well as by sequentially equipping the first dosing part (211) and the second dosing part (212) on the feed water pipe (200A, 200B) which are separately divided as shown in FIG. 3. In this case, the thermal efficiency can be optimized by providing the pre-heaters (220) only on the feed water pipe (200A) to be dosed into the evaporators (100) excluding the high temperature part (H).

Meanwhile, when the risk for scale formation is somewhat less according to the situation of feed water or the operation condition, the amount of the used anti-scalant and acid can be reduced in the first dosing part (211) and the second dosing part (212) by recycling all or some of concentrated water comprising anti-scalant or acid, as discharged from the evaporator (100) and re-utilizing the anti-scalant and acid component comprised therein. Specifically, the concentrated water in the evaporator (100) of the high temperature part (H) treated with acid is re-utilized by recycling into the feed water pipe (200) to be dosed into the high temperature part (H), and it can be re-dosed from the feed water pipe (200) by partially recycling the concentrated water of the evaporator (100) corresponding to the low temperature part.

Also, when the high temperature steam is fed from the exterior steam source, which is generally produced by a power plant, etc., since the final treated water can be contaminated by various harmful materials, additives, etc., included in the steam, a steam transformer is to be provided in order to primarily secure the making of the drinking water in a hybrid facility of the power plant and multi-effect desalination facility. But, since the present invention can obviate the need for thermal vapor compression (TVC) or a steam transformer by isolating the farthest upstream evaporator (100A) from other evaporators (100) to play the role of the steam transformer, and recovering the condensed water formed in the farthest upstream evaporator (100A) fed with the vapor directly from the exterior, a change in load can be easy and loss of temperature can be minimized.

Hereinafter, examples for the multi-effect desalination apparatus partially dosing acids into some evaporators with high temperature of the present invention and the desalination method using the same will be explained. However, since it is merely the most preferable example of the present invention and does not represent all of the technical ideas, it is to be understood that various equivalents and modification examples which are able to replace them can be present.

Example 1

<Setting 86-110° C. as the Brine Temperature of the High Temperature Part (H)>

Generally, the top brine temperature has been limited to less than about 70° C. in MED facility due to the risk of scale formation, but the top brine temperature of MED facility can be greatly raised at least 5° C. or more by partially dosing acid in the present disclosure, and the top brine temperature can be about 75~130° C. according to the saline condition, the dosing amount of acid, the system planning, etc.

Figure 4:
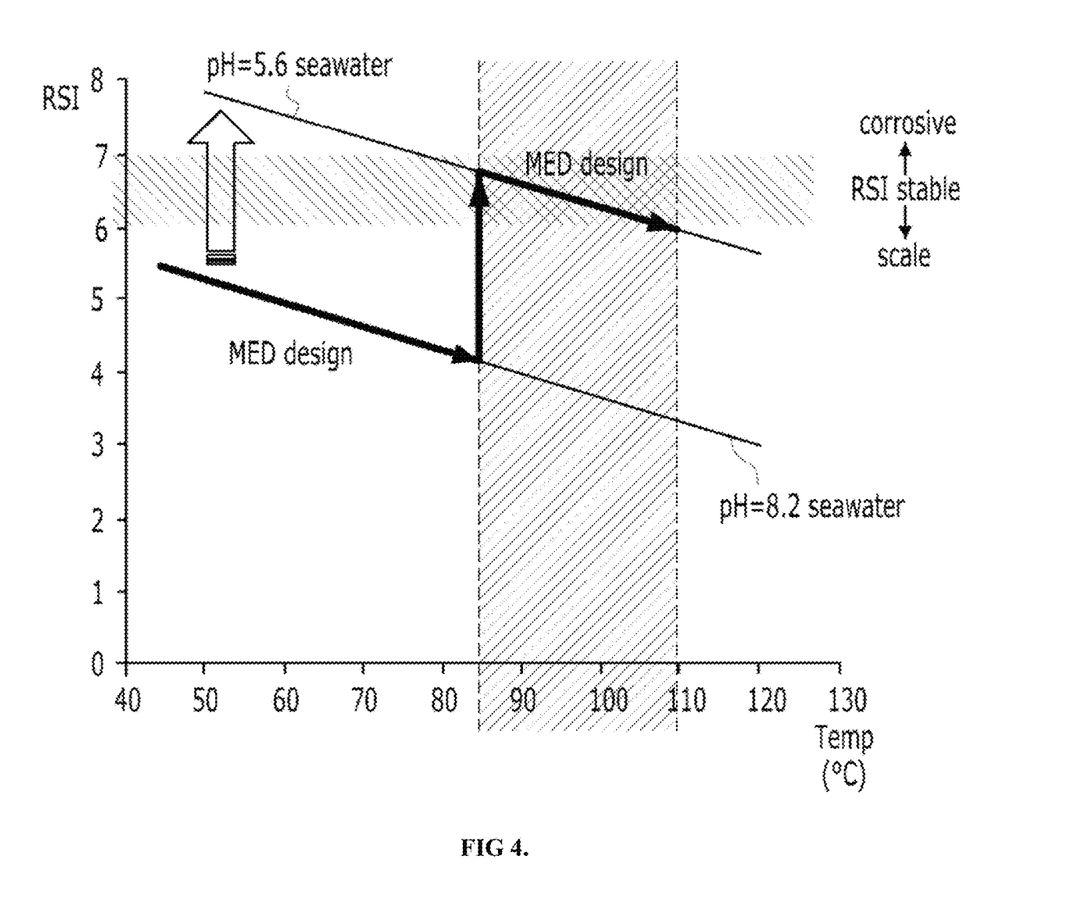
FIG. 4 is a graph representing RSI value according to the temperature for calculating the brine temperature range of the high temperature part (H) according to Example 1.

Specifically, the multi-effect desalination apparatus (A) can be operated by setting the upstream evaporators (100) with the brine temperature of 86~110° C. according to the Example 1 of the present disclosure.

Referring to FIG. 4, the ordinary seawater without dosing acid exhibits pH value of about 8.2, but since RSI value is lower when it reaches the level of about 86° C., the risk of the scale formation cannot be offset only by dosing the anti-scalant. When the pH value of the seawater is lowered to about pH 5.6 with dosing the proper amount of acid to the extent that the risk of corrosion is not present by setting the high temperature part (H) from the evaporators (100) corresponding to such zone, since the stable operation is possible by minimizing the scale risk, the top brine temperature can be increased to about 110° C.

Example 2

<Setting 65-90° C. as the Brine Temperature as the High Temperature Part (H)>

Meanwhile, although the present disclosure greatly lowers the brine temperature of the high temperature part (H) according to example 2, its proper input amount of acid and the point to be dosed, etc. can be effectively calculated.

Figure 5:
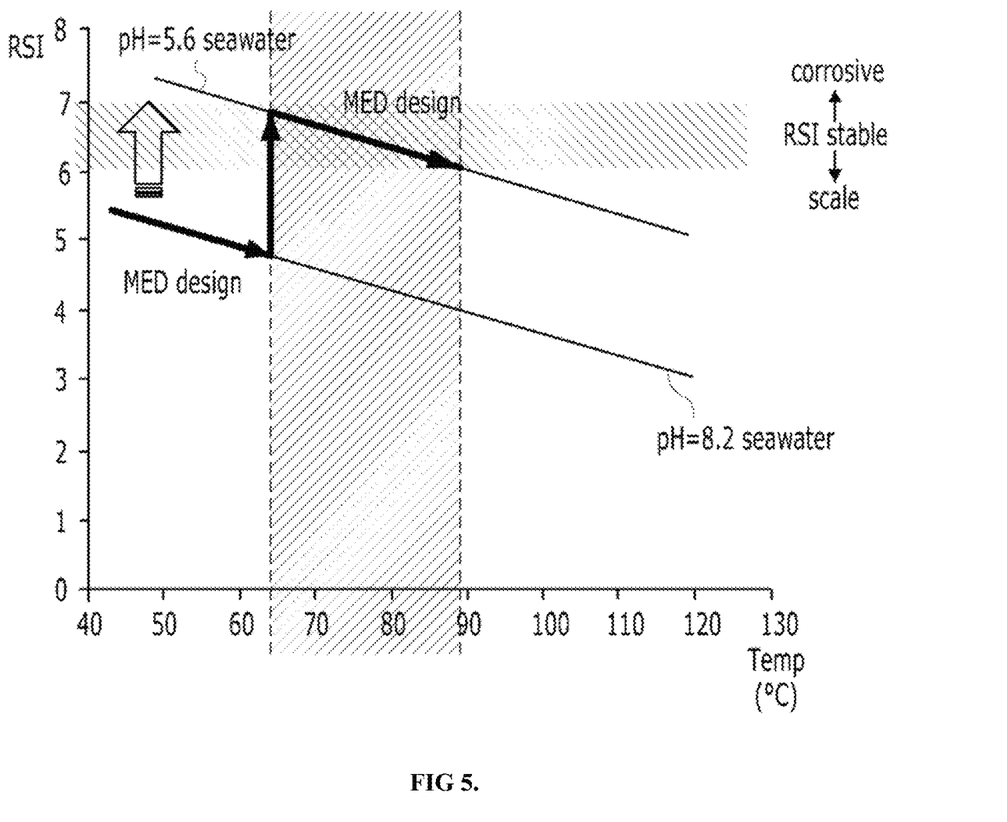
FIG. 5 is a graph representing RSI value according to the temperature for calculating the brine temperature range of the high temperature part (H) according to Example 2 of the present disclosure.
Figure 6:
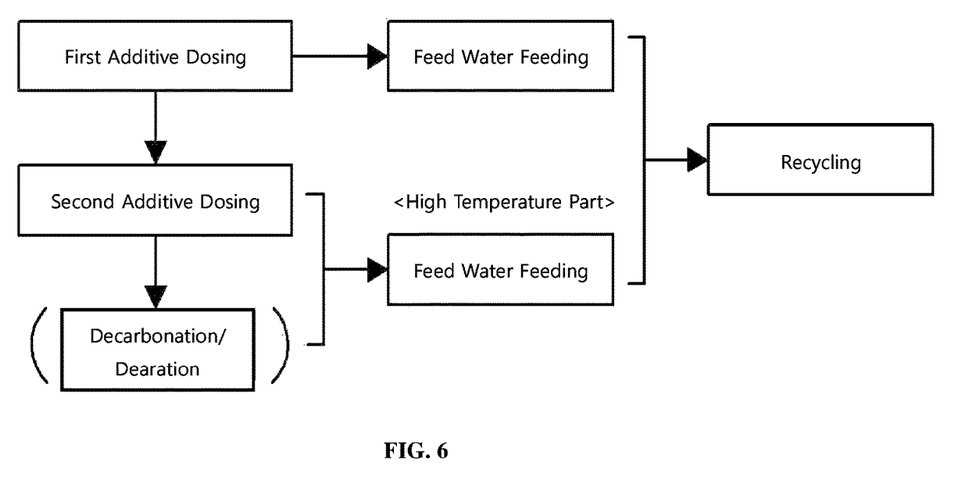
FIG. 6 is a flow chart for the multi-effect desalination method according to one Example of the present disclosure.

Specifically, as shown in FIG. 5, the multi-effect desalination apparatus (A) can be operated by setting the upstream evaporators (100) in which the saline temperature is about 65-90° C. as the high temperature part (H), and the facility can be effectively operated without risk of scale and corrosion by controlling the scale risk raised around the saline temperature of about 65° C. to the stable interval.

Further, the embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A multi-stage desalination apparatus, comprising:
a feed water pipe to feed the apparatus with feed water;
at least one additive-dosing part to dose an additive into the feed water, the dosed additive inhibiting a generation of scale; and
a plurality of evaporator stages arranged in series in which a farthest upstream evaporator stage of the plurality of evaporator stages is fed with steam from a steam source, each evaporator stage including heat exchange tubes disposed in an interior heat exchange space, and each evaporator stage receiving the feed water of the feed water pipe on an external surface of the heat exchange tubes to respectively generate both concentrate water and a generated steam from the received feed water through a heat exchange between the steam from the steam source in the farthest upstream evaporator or the generated steam in downstream stages of the plurality of evaporator stages, respectively, and the feed water, the generated steam being fed to an adjacent downstream evaporator stage to provide a continuous heat exchange completed by a farthest downstream evaporator stage of the evaporator stages, wherein the evaporators of the plurality of evaporator stages are sorted into plural groups according to a temperature interval to control the dosing amount of the additive based on respective risk levels of scale formation and corrosion formation, wherein the at least one additive-dosing part comprises:
a first dosing part to dose a polymer-based anti-scalant into the feed water of all of the evaporator stages, and
a second dosing part to dose acid only into the feed water of evaporator stages associated with a high temperature part of the sorted evaporator stages, the high temperature part of the sorted evaporator stages including the farthest upstream evaporator stage, wherein the high temperature part includes upstream evaporator stages of the plurality of evaporator stages, the upstream evaporator stages including the farthest upstream evaporator stage and at least one evaporator stage arranged downstream of the farthest upstream evaporator stage, and wherein the multi-stage desalination apparatus further comprises
a decarbonator and a deaerator each of which is arranged downstream of the second dosing part, the deaerator being connected to the feed water pipe respectively feeding the evaporator stages of the high temperature part in order to supply each evaporator stage of the high temperature part with feed water from which carbon dioxide and air has been removed; and
at least one preheater connected to an output of the deaerator to heat the feed water entering the farthest upstream evaporator stage of the plurality of evaporator stages,
wherein the at least one evaporator stage arranged downstream of the farthest upstream evaporator stage includes a first evaporator stage connected to the deaerator by a line configured to bypass the at least one preheater, the line further configured to bypass the farthest upstream evaporator stage and any additional evaporator stage upstream of the first evaporator stage.

2. The multi-stage desalination apparatus according to claim 1, wherein the temperature interval of the high temperature part is set using a temperature-dependent hardness index for the feed water, the hardness index being one of a Ryzar Stability Index (RSI) value of $2\, pH_s - pH_f$ and a Langelier Saturation Index (LSI) value of $pH_f - pH_s$, where $pH_f$ is the pH value of the feed water of a corresponding evaporator stage and pHs is the pH value when the feed water is saturated by calcium carbonate and is calculated as $$pH_s = -\log(K_2^{SW}) + \log(K_{sp}) - \log(TA) - \log([Ca^{2+}])$$

where $K_2^{SW}$ is a second dissociation constant of carbonic acid, $K_{sp}$ is a solubility product constant of calcite in feed water, $[Ca^{+2}]$ is a concentration of calcium ions in feed water, and TA is a total alkalinity.

3. The multi-stage desalination apparatus according to claim 1, wherein the farthest upstream evaporator stage has a brine temperature in a range of 86 to 110° C.

4. The multi-stage desalination apparatus according to claim 1, wherein the farthest upstream evaporator stage has a brine temperature in a range of 65 to 90° C.

5. The multi-stage desalination apparatus according to claim 1, wherein the second dosing part includes plural second dosing parts connected to the feed water pipe to regulate an amount of the acid dosed into multiple evaporator stages corresponding to the high temperature part.

6. The multi-stage desalination apparatus according to claim 1, wherein the first dosing part is arranged upstream of the second dosing part on the feed water pipe.

7. The multi-stage desalination apparatus according to claim 1, further comprising an additional at least one preheater to heat the feed water entering respective stages of the plurality of evaporator stages excluding the upstream evaporator stages.

8. The multi-stage desalination apparatus according to claim 1,
wherein the sorted evaporator stages are classified into the high temperature part including the farthest upstream evaporator stage, a middle temperature part, and a low temperature part including the farthest downstream evaporator stage,
wherein the at least one additive-dosing part includes the first dosing part in order to dose a polymer-based anti-scalant additionally into the evaporator stages of the middle temperature part.

9. The multi-stage desalination apparatus according to claim 1,
wherein the sorted evaporator stages are classified into the high temperature part including the farthest upstream evaporator stage and remaining evaporator stages excluding the high temperature part and including the farthest downstream evaporator stage, and
wherein the first and second dosing parts control the doses into each of the plural groups of sorted evaporator stages based on the respective risk levels of scale formation and corrosion formation.

10. The multi-stage desalination apparatus according to claim 1,
wherein the at least one preheater connected to the output of the deaerator consists of at least two preheaters, and
wherein the at least one evaporator stage arranged downstream of the farthest upstream evaporator stage consists of a plurality of serially arranged evaporator stages, the plurality of serially arranged evaporator stages including the first evaporator stage and a second evaporator stage connected to the deaerator through one of the at least two preheaters.

* * * * *